United States Patent [19]

Morrison

[11] Patent Number: 5,729,277

[45] Date of Patent: Mar. 17, 1998

[54] SYSTEM AND METHOD FOR MODIFYING AN OUTPUT IMAGE SIGNAL TO COMPENSATE FOR DRUM VELOCITY VARIATIONS IN A LASER PRINTER

[75] Inventor: Robert D. Morrison, Star, Id.

[73] Assignee: Hewlett-Packard Company, Palo Alto, Calif.

[21] Appl. No.: 504,010

[22] Filed: Jul. 19, 1995

[51] Int. Cl.[6] ........................................................ B41J 2/47
[52] U.S. Cl. ........................................ 347/248; 347/234
[58] Field of Search ................................ 347/248, 250, 347/234, 249, 235

[56] References Cited

U.S. PATENT DOCUMENTS 4,613,877  9/1986  Spencer et al. ........................ 347/248
4,761,662  8/1988  Yoshimoto et al. .................... 347/248
4,893,135  1/1990  Jamzadeh .............................. 347/248

Primary Examiner—Mark J. Reinhart
Attorney, Agent, or Firm—Lane R. Simmons

[57] ABSTRACT

A system and method of correcting aberrations in an output image of an image transfer apparatus, the aberrations being due to variations in a velocity of a scanning surface in the image transfer apparatus. Specifically, laser printer banding effects are reduced by modifying the gray scale dithering concentration based on a sensed variation of drum rotation velocity. A closed loop feedback system monitors errors in the drum motion and compensates the modulation of the laser to help cancel out the perceivable amount of banding effect in the printed image.

19 Claims, 3 Drawing Sheets

180° PHASE
0% TRANSMISSION

0° PHASE
50% TRANSMISSION

90° PHASE
25% TRANSMISSION

135° PHASE
37.5% TRANSMISSION

SYSTEM AND METHOD FOR MODIFYING AN OUTPUT IMAGE SIGNAL TO COMPENSATE FOR DRUM VELOCITY VARIATIONS IN A LASER PRINTER

FIELD OF THE INVENTION

This invention relates in general to image transfer technology and, more specifically, to image banding correction in a laser printer.

BACKGROUND OF THE INVENTION

In laser printer technology, generally, a latent image is created on the surface of an insulating, photo-conducting material (usually in the form of a rotating drum) by selectively exposing areas of the surface to light. A difference in electrostatic charge density is created between the areas on the surface exposed and unexposed to light. The visible image is developed by electrostatic toners. The toners are selectively attracted to the photoconductor surface either exposed or unexposed to light, depending on the relative electrostatic charges of the photoconductor surface, development electrode, and the toner. The photoconductor may be either positively or negatively charged, and the toner system similarly may contain negatively or positively charged particles.

Typically, a transfer roller is given an electrostatic charge opposite that of the toner and rotated close to the photoconductor surface. The transfer roller pulls the toner from the photoconductor surface and transfers it onto a charged sheet of paper, the toner still in the pattern of the image developed from the photoconductor surface.

More specifically, laser printers operate by scanning a laser beam horizontally across the photosensitive, electrically charged drum. If the laser beam is modulated, variations in charge will ultimately be translated to proportionate amounts of toner deposited on a sheet of paper. However, since laser printers are designed to run very fast, this architecture has proven to be extremely sensitive to variations in drum speed. These variations appear on the printed page as increased or decreased spacing between lines and visually appear as bands. This undesirable effect is called banding. Banding is a particularly severe problem for faster laser printers which are printing gray scale images, such as photographs. Research has shown that the most severe banding effect occurs at intermediate levels of gray. Although most laser printers cannot truly print gray, they dither white and black at high resolution to achieve a perceived gray image. In contrast, because laser printers overlap scans, image transfers of solid black (and, of course, solid white) do not experience any banding.

The principle cause of banding is due to gear noise, although stepper motor frequencies and scanner frequency variations also contribute slightly to this problem. Gear noise results from imperfect spacing of gear teeth, variances in flexing of gear teeth as forces are transferred from one gear to the next, and other intrinsic variations in gear force transfer. The stepper motor contributes to banding because as it drives the gear array in a laser printer it may have slight variations in angular velocity due to the multiple magnet positions for each step. The scanner assembly consists of a rotating multi-sided mirror and the laser diode. Imperfections of the mirror surfaces, uneven beveling of each facet, and vibration of the scanner assembly relative to the drum also contribute to the banding effect.

Since new printer products are consistently designed to print faster, the problem of banding is likely to continue.

Conventionally, attempts at reducing banding effects have been focused on mechanical fixes related to gear noise, the stepper motor, and/or the scanner assembly. For example, mechanical fixes may involve gears with helical drive or gears made of better materials, but these generally add significantly more expense to the final product. Furthermore, these approaches do not address the root cause of the banding problem, that is, the open loop (no feedback) nature of how the drum is rotated. Namely, the drum is driven by a constant speed motor drive system, and no feedback from any source is used to modify the motor speed or to correct some of the previously mentioned contributions to banding.

Accordingly, objects of the present invention are to provide a new system and method for reducing the visual impact of banding.

SUMMARY OF THE INVENTION

According to principles of the present invention in a preferred embodiment, output image aberrations caused by scanning surface velocity variations are corrected in an image transfer apparatus. Specifically, laser printer banding effects are reduced by modifying the gray scale dithering concentration based on a sensed variation of drum rotation velocity. A closed loop feedback system monitors errors in the drum motion and compensates the modulation of the laser to help cancel out the perceivable amount of banding effect in the printed image.

A drum sensor includes a light source directed upon a reflecting surface area of the drum, the reflecting surface area having a lined ruling or grating printed, placed, or scribed thereon. The light is reflected back through a fixed transparent film to a phototransistor that is focused on the grating. The transparent film has a lined ruling printed thereon to match that of the drum. As the grating on the drum moves underneath the fixed film, the light is reflected back to the phototransistor unless the phase of the moving grating interferes with the fixed lined ruling on the film.

A circuit measures each time the moving grating blocks reflection of the light path, thus providing an accurate measure of the drum velocity whereby a rotation error value is calculated. The error value is translated in corrector circuitry so that varying amounts of very small (sub-pixel size) white or black dots are applied through high pulse width modulation (dithering) to the printed image in such a way that the eye perceives a gradual increase or decrease in the amount of gray. The amount of gray is designed to counteract the increase or decrease in line density (banding) detected by the drum sensor due to rotational velocity variations.

According to further principles of the present invention, a pseudo-random circuit correction scheme is used for applying chaotic dithering, rather than periodic dithering, to avoid undesirable visible artifacts in the printed image.

Other objects, advantages, and capabilities of the present invention will become more apparent as the description proceeds.

DETAILED DESCRIPTION OF THE INVENTION

Figure 1:
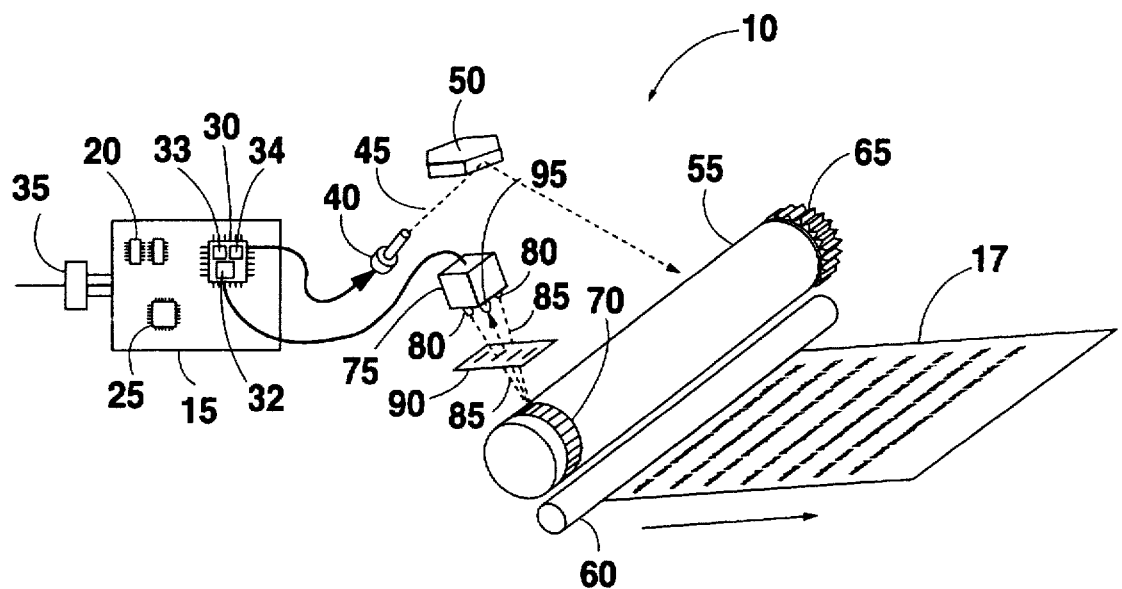
FIG. 1 is a schematic block diagram of the present invention system for correcting aberrations in an output image of a laser printer, the aberrations caused by variations in the velocity of the photoconductive drum of the laser printer.

FIG. 1 is a schematic block diagram of the present invention system 10 for correcting aberrations in an output image of a laser printer, the aberrations being caused by variations in the velocity of the photoconductive drum of the laser printer. Although the present invention is described in terms of laser printer technology, it is obvious to one of ordinary skill in the art that the present invention is equally applicable to other similar forms of image transfer technology (for example, photocopying). Accordingly, rather than describe all variations of image transfer technology herein, this discussion will be limited to laser printer terminology but with rights in the invention being limited only by the claims relative to image transfer technology in general.

Printed circuit assembly (PCA) 15 embodies the general formatter electronics for printing an image to paper 17. Namely, PCA 15 includes memory 20, such as Random Access Memory (RAM), for holding an image to be printed, microprocessor 25 for processing the image to be printed, general circuitry 30, velocity circuitry 32, error circuitry 33, corrector circuitry 34, and input/output (I/O) interface 35 for connecting PCA 15 to separate computing components. Velocity circuitry 32, error circuitry 33, and corrector circuitry 34 are shown as separate components for ease of discussion purposes only. However, as conventional in the art, it is obvious that each may be combined or embodied in general ASIC circuitry 30, or separate if so desired.

PCA 15 communicates with laser diode 40 which emits laser beam 45. Laser beam 45 is reflected off of rotating scanning mirror 50 and onto drum 55. Drum 55 is a photoconductive, electrically charged drum for holding an image to be transferred (printed) to transfer roller 60 and subsequently onto paper 17. Gear drive 65 is connected to drum 55, and gear drive 65 meshes with other gear drive components (not shown) of the laser printer for rotating drum 55.

Although photoconductive drum 55 is shown, it is obvious that a continuous, photoconductive belt (not shown) or other medium of transfer, photoconductive or not, could just as easily be used in place of drum 55. For example, if the present invention were employed with ink jet printer technology, a non photoconductive drum surface may be used. However, regardless of the image transfer technology at issue, some component in the system is used as an active scanning area surface for creating an image to be transferred, and it is that surface and/or the velocity of it that is at issue with the present invention system and method.

Part of the novelty of the present invention includes the use of two separate lined rulings (or gratings). Although the interference gratings describe a preferred embodiment of the present invention, other sensing means and apparatus may be employed for sensing variations in drum velocity. For example, a capacitive or mechanical sensor or accelerometer could be associated with the drum for presenting a velocity variation signal. Although the terms "ruling" or "grating" may have various meanings, as used in this context, lined ruling or grating (ruling will be used herein for simplicity sake) means any region having alternating areas capable of light transmission (reflection) with alternating areas capable of light absorption. Furthermore, the ruling may be printed, placed, scribed, attached, or the like, on the surface with which it is associated, so long as it is rigidly affixed thereto, or as a part thereof.

A first lined ruling 70 is associated with or on a reflective surface of drum 55. Obviously, the surface on which the ruling is placed is an unused area of the drum which does not affect the normal photoconductive utility of the drum. First ruling 70 rotates with drum 55 and, thereby, is considered a moving lined ruling.

Sensor 75 includes light source 80 which directs a light 85 upon first ruling 70. The light is reflected back through a second ruling 90, which is fixed between first ruling 70 and sensor 75, to photosensor 95 that is focused on first ruling 70. Photosensor 95 is, preferably, a phototransistor, although a photodiode or other light detection device will function similarly. Second ruling 90 is printed on a transparent film, although the ruling could equally be used with or formed from other means so long as the ruling satisfies the definition of ruling defined herein. The second ruling is sized, spaced, and positioned to match first ruling 70 on drum 55. In the preferred embodiment, first ruling 70 and second ruling 95 embody about 250 lines per inch, and photosensor 95 has about a 1.2 KHz response rate.

Upon detection of light 85 reflected from first ruling 70, phototransistor 95 generates a reflection signal (current) indicative of an amount of light detected as reflected off of ruling 70 and back through second ruling 90. The reflection signal is transmitted to velocity circuitry 32. In the present invention, velocity circuitry 32 is embodied in general circuitry 30 of PCA 15 (i.e., circuitry 30 is an ASIC), but could just as well be separate. The velocity circuitry is engineered by conventional means in the art and determines a velocity of the surface of drum 55 based on a rate of change of the amount of light detected.

Specifically, during image transfer (printing) operations, as first ruling 70 rotates with drum 55 underneath fixed second ruling 90, the light 85 is reflected back to phototransistor 95 unless the phase of moving first ruling 70 interferes with fixed second ruling 90. Namely, the amount of light detected or, more accurately, the rate of change of light detected, and thus the reflection signal generated by sensor 75, is proportional to a phase of first ruling 70 in movement relative to second ruling 90.

More specifically, the velocity circuitry determines a velocity of drum 55 as follows:

$$A(\text{reflected})=A(\text{total})-A(\text{fixed})-A(\text{moving})+A(\text{moving underneath fixed})$$

where:

A(reflected) is the area of exposed reflective surface of first ruling 70 (i.e., exposed to phototransistor 95 relative to second ruling 90);

A(total) is the total amount of non light absorbent area occupied by both first and second rulings 70 and 90.

A(fixed) is the area occupied by fixed second ruling 90 (i.e., the light absorbent portions);

A(moving) is the reflective area occupied by moving first ruling 70; and

A(moving underneath fixed) is the reflective area of moving first ruling 70 that is underneath (i.e., blocked by or out of phase with) fixed second ruling 90. In the preferred embodiment and if the areas are normalized to a unit space, then A(fixed) and A(moving) are set to 0.5 (50% area occupied).

The movement of drum 55 causes a variation in A(moving underneath fixed) which will be abbreviated as A(muf). This area is exactly proportional to the phase of the drum rotation relative to fixed second ruling 90. If the drum circumference is cir(drum), then the angular velocity of the drum can be expressed as av(theta) and the linear velocity of the moving grating is:

$$lv = \frac{av(theta) * cir(drum)}{2Pi}$$

If there are n ruling/grating lines in first ruling 70 over the circumference of drum 55, then the frequency of moving first ruling 70 relative to fixed second ruling 90 is:

$$Freq(S(t)) = \frac{aav(theta) * n}{2Pi}$$

where S(t) is the electrical signal generated by phototransistor 95, thus demonstrating that the frequency of the signal S(t) generated by phototransistor 95 and sensor 75 is directly proportional to the linear velocity of the drum surface and, in fact, is related as:

$$lv = Freq(S(t)) * cir(drum)/n.$$

Now that the frequency relation is established, it is helpful to establish the wave structure of the signal S(t). We first assume that there is no spacing (vertical distance) between the first and second rulings and that the curvature of drum 55, moving first ruling 70, and fixed second ruling 90 is zero in the observed neighborhood of photosensor 95. Then, the phase of the moving first ruling 70 relative to fixed second ruling 90 can be used to set the offset position of the left side of moving first ruling 70. It then becomes quite clear that since an ideal angular velocity is constant, the phase change with time is also constant. It then directly follows that the left edge of the moving first ruling will experience a rate of position change relative to the fixed ruling that is also constant. However, the area covered by the fixed ruling is a function f(t) of the position of the moving ruling and can be expressed as:

$$f(t) = A(muf) = A(moving) * \frac{(Pi - Phase(t))}{Pi}$$

The photosensor will receive light proportional to the area exposed by both rulings, A(reflected), which now can be expressed as:

$$A(reflected) = A(total) - A(fixed) - A(moving) +$$

$$A(moving) * \frac{(Pi - Phase(t))}{Pi}$$

In the present invention system, as explained previously, a normalized system results in A(total)=1.0, and A(fixed)=A (moving)=0.5, which then results in:

$$A(reflected) = (Pi - Phase(t))/(2*Pi)$$

This is a triangular wave with a frequency proportional to the angular velocity of the drum. When the phase is 0, A(reflected) will be ½, while when the phase is 180 degrees (Pi radians), A(reflected) is 0. It is straight forward to show that changes in the angular velocity of the drum translate to linear changes in the phase velocity and hence translate to linear changes in the reflected area A(reflected). Therefore, (reflected) linearly follows changes in the angular velocity of the drum.

Error circuitry 33 receives and responds to signal S(t) and translates the signal to an error value signal that can be used to adjust a correction factor that will cancel out the visual output effect of varying drum rotation rates. Error circuitry 33 is also embodied in ASIC circuitry 30 of PCA 15, but could equally be otherwise.

To determine the error value signal, a moving average time between detected ruling lines is computed by referencing the zero crossing points of the signal S(t). A moving average, for example, may be the sum of the last 511 samples, plus the current latest sample, and then divided by 512. Since there are slow variations (accelerations) in drum movement that should not be compensated, a moving average is used, rather than a continuous average. The moving average filters out low acceleration values that we don't want to correct for. Preferably, the moving average of zero crossing points is maintained independently for both rising and falling zero crossing points. The idealized S(t) is a triangular wave that crosses zero amplitude when it is rising and when it is falling. The current latest time between rising or falling zero crossing points is then compared to the moving average in error circuitry 33 to generate a rotation error value signal E(t) that is a linear function of the change in angular drum velocity.

Finally, this error E(t) is translated to a code that goes to corrector circuitry 34. The error code may be system dependent, but is used to modify the output image signal controlling laser diode 40. The code modifies the laser diode output signal to correct aberrations in the output image due to variations in the velocity of the drum. Specifically, in a preferred embodiment, the error code causes the video signal to linearly increase the amount of toner printed on the page when the drum velocity has increased momentarily (or decrease the amount of toner if the error indicates the drum velocity has decreased momentarily). The coding used may be any conventional coding in the art so long as it appropriately modifies the laser diode output signal responsive to movement variations in the photoconductor drum.

In the present case and preferred embodiment, banding aberrations are corrected by controlling the pulse width modulation (PWM) duty cycle of the laser diode. The resultant effect appears, seemingly, as a decrease in laser diode intensity. Optionally, however, the corrective output signal may be a signal controlling some other aspect of the laser diode, rather than the duty cycle, or a signal controlling some other component of the image transfer device, so long as a closed loop system is formed, and so long as the output signal modified is responsive to movement variations in the photoconductor unit or other scanning surface for banding correction purposes. For example, the corrective output signal may, optionally, control intensity of the laser diode, movement of operation of the laser diode, movement of operation of some other image transfer component, such as an ink cartridge in an ink jet printer, or the like.

FIGS. 2A–D are block diagrams showing phase and light transmission (reflection) properties of the present invention for determining a velocity of a scanning surface (photoconductor drum) in a laser printer. As discussed, during image transfer operations, as first ruling 70 rotates with drum 55 underneath fixed second ruling 90, the light is reflected back to phototransistor 95 unless the phase of moving first ruling 70 interferes with fixed second ruling 90. For ease of reference, the light-absorbent (non reflective) rulings of moving first ruling 70 are shown as cross hatched in a direction opposite that of the non reflective rulings of fixed second ruling 90.

Figure 2A:
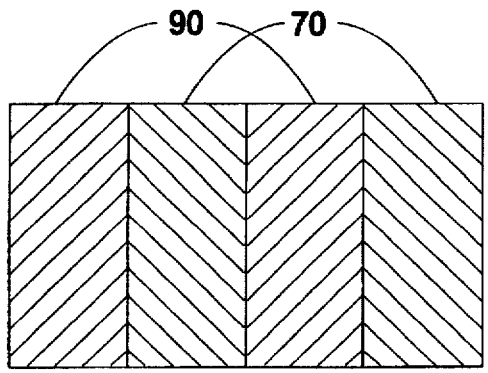
FIGS. 2A–D are block diagrams showing phase and light transmission properties of the present invention for determining a velocity of a photoconductive drum scanning surface of a laser printer.
Figure 2B:
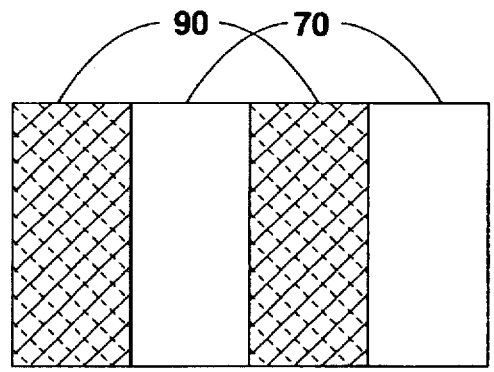

In reference now to FIG. 2A, the first and second rulings are at a 180 degree phase with respect to each other such that no light is transmitted (reflected) back to photosensor 95. In contrast, FIG. 2B shows the rulings at a zero (0) degree phase such that a 50% light transmission results. In this instance, first ruling 70 has moved underneath fixed second ruling 90 so that the reflective portions of first ruling 70 reflect the light back between the rulings of second ruling 90. The non reflective rulings of first ruling 70 are shown in phantom underneath fixed second ruling 90.

Figure 2C:
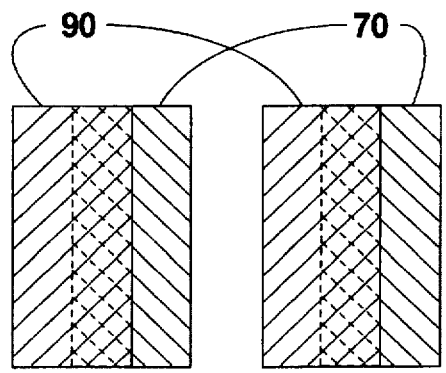
Figure 2D:
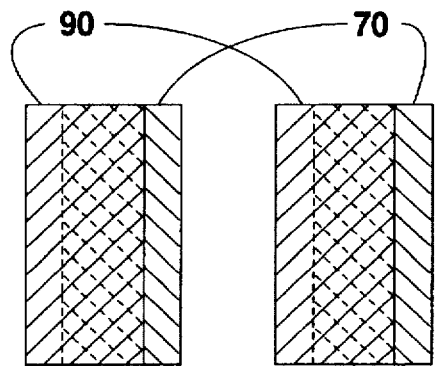

FIGS. 2C-D show alternate phase and transmission properties. Specifically, in FIG. 2C first ruling 70 has moved 90 degrees out of phase with fixed second ruling 90 such that a 25% light transmission results. FIG. 2D shows a 135 degree phase and 37.5% transmission.

All in all, the amount of light reflected off of first ruling 70 back through second ruling 90 and sensed by photosensor 95 causes a reflection signal to be generated by sensor 75 proportional to a phase of first ruling 70 in movement relative to second ruling 90.

Figure 3:
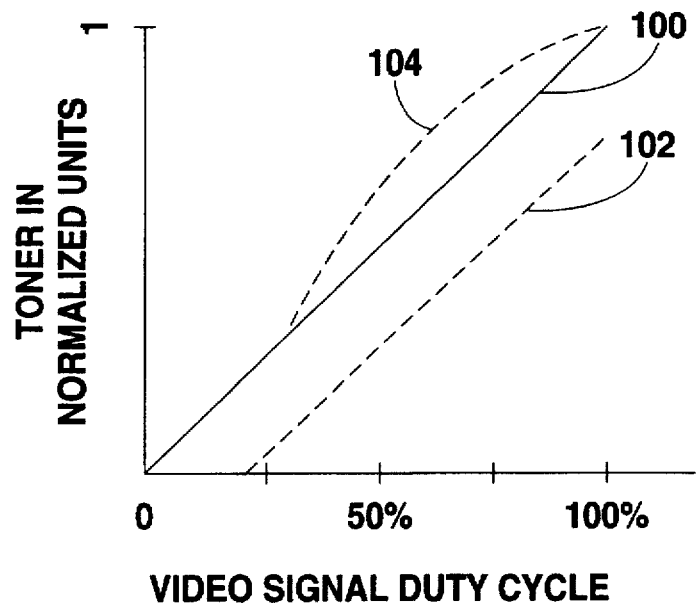
FIG. 3 is a graph showing how the duty cycle of a video signal in a laser printer is modified responsive to the present invention system for banding correction.

FIG. 3 shows how corrector circuitry 34 responds to the error value signal by modifying the duty cycle of the video signal of laser diode 40 to affect the photoconductive drum so that varying amounts of very small white or black dots are applied to the output image in such a way that the eye perceives a gradual increase or decrease in the amount of gray printed on the page. The amount of gray is designed to counteract the increase or decrease in line density detected by the drum sensor. The corrector circuitry uses a high speed (sub-pixel size) correction scheme, chaotic pulse width modulation (PWM), otherwise the correction will corrupt the image.

PWM is the modification of the duty cycle of the video (laser) signal wave form within a unit amount of time which has the effect of changing the apparent intensity. The duty cycle is the percent of time the signal is in an active state. In the figure, the x axis represents the video signal duty cycle of the laser, and the y axis represents the amount of toner deposited on a page responsive to the amount of laser signal transferred to the photoconductive drum. The numbers on the x axis represent a percentage of a period or length of time in one cycle of the current video signal to the laser. The number 1 on the y axis represents the amount of toner to be applied (in normalized units) to a printed page during a complete cycle for achieving a full toner (100% black) visual appearance. An uncorrected (normal) video signal is shown at reference 100, and represents how during a normal duty cycle the video signal ramps up from 0% to 100% in signal strength, thereby causing a full normalized unit of toner to be applied for a 100% black appearance.

To achieve a level of grey desired, the process of PWM modifies the activation of the signal (duty cycle) such that the percent time active in a single period (cycle) is reduced. Signal 102 in FIG. 3 represents how the duty cycle is corrected (modified) in response to a temporary slowing in the velocity of the scanning surface (drum). When the velocity of the drum slows relative to a moving average, an aberration results in that the laser scan lines become closer together. Therefore, toner must be removed to correct for the scan line aberration. To remove toner, the video signal is reduced in activation time relative to a full cycle. As such, at completion of the cycle, it can be seen that a full normalized unit of toner has not been applied. Accordingly, although a specified reduction in the duty cycle doesn't actually give an equivalent or proportionate grey appearance (because of the non linear nature of the transfer of toner), an amount of grey is perceived on the printed page.

In contrast, signal (transfer function) 104 represents how the duty cycle is corrected in response to a temporary increase in the velocity of the drum. When the velocity of the drum increases relative to the moving average, an aberration results in that the laser scan lines become farther apart. Therefore, toner must be added to correct for the scan line aberration as shown by transfer function 104. To add toner, the duty cycle of the video signal is delayed in activation to form a signal similar to that shown at 104. Although this effect causes a darker appearance on the printed page to adjust for the aberration, it must be used selectively and not around image areas that should not have any toner applied.

While this system and process is rigorous in theory, there are practical adjustments that improve its visual impact. First, caution must be used to linearly adjust the toner placed on the page. Any periodic system of toner placement/adjustment will result in visible patterns within the grey area that is being printed, so it is extremely important to use a chaotic system for toner placement/adjustment. In the preferred embodiment, a conventional pseudo-random generator (PRG) circuit, similar to that used in a 31 bit CRC Cyclic Redundancy Check, is used to determine when a correction sub-pixel (PWM) is added or removed from the existing printed pattern. This results in very satisfactory gray level control of the banding effect. Namely, the PRG correction method is a chaotic dithering method which demonstrates excellent banding correction without degrading the quality of text or line-art on the printed page.

However, adding toner (as opposed to removing it) is much more problematic. While removing toner produces the desired effect without affecting regions that are solidly white or black, adding black dots, even chaotically, is unsatisfactory. It is necessary to have a window with some adjacent black areas before a darker gray shading adjustment is done.

Figure 4:
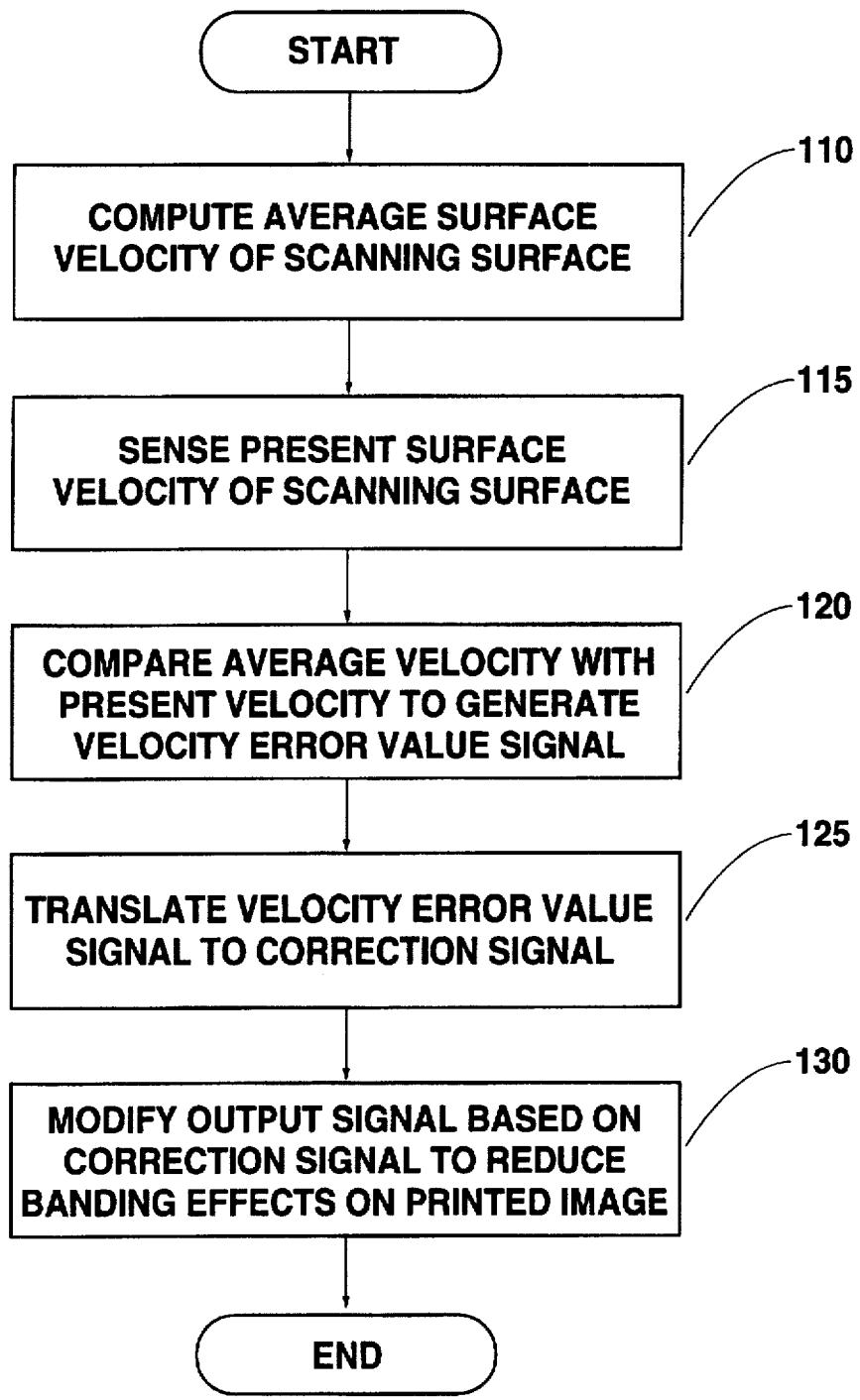
FIG. 4 is a flow chart showing the method of the present invention.

Referring now to FIG. 4, a flow chart depicts the method of the present invention system for correcting aberrations in an output image of an image transfer apparatus, the aberrations caused by variations in the velocity of the scanning surface of the apparatus. Specifically, and in the context of the emphasis of this disclosure, the present invention method is for reducing laser printer banding effects.

First, 110, an average surface velocity is computed for the scanning surface (such as a photoconductor drum) of an image transfer device (such as a laser printer). As mentioned, the velocity may be the surface rotational velocity of a photoconductor drum, the surface velocity of a continuous loop belt, or the surface velocity of any other scanning surface conventionally used in image transfer equipment.

Next, 115, a present velocity of the scanning surface is sensed, and the average velocity is compared with the present velocity to generate a velocity error value signal 120. The velocity error value signal indicates an amount that the present velocity differs from the average velocity. The error value signal is then translated to a correction signal 125. The correction signal may be any of a variety of conventional output signals that are capable of controlling some component in the image transfer device. In a preferred embodiment, the output signal controls the modulation of light emitted by a laser diode within a laser printer to control the amount of toner deposits on the printed page. However, it is obvious that the output signal may control other aspects of the image transfer device, such as movement of the laser diode itself, timing of the laser diode, operation of some other image transfer component, or the like, so long as the output signal reflects a correction for variation in velocity of the scanning surface of the image transfer device.

Finally, 130, the correction signal modifies the laser output to reduce the aberrations (banding effects) on the printed image that result from variations in the surface velocity of the scanning surface.

What has been described above are the preferred embodiments for a system and method of reducing laser printer banding effects. It will be obvious that the present invention is easily implemented utilizing any of a variety of hardware and/or software existing in the art. Furthermore, while the present invention has been described by reference to specific embodiments, it will be obvious that other alternative embodiments and methods of implementation or modification may be employed without departing from the true spirit and scope of the invention.

What is claimed is:

1. A system for modifying an output image signal for reducing aberrations in an output image of an image transfer apparatus, the system comprising:
   (a) sensing apparatus for sensing a velocity of a scanning surface associated with the image transfer apparatus;
   (b) error generating apparatus coupled to the sensing apparatus for generating a velocity error value signal for the scanning surface; and,
   (c) output image signal corrector apparatus coupled to the error generating apparatus for correcting an output image signal in response to the velocity error value signal thereby reducing aberrations in the output image caused by variations in the velocity of the scanning surface.

2. The system of claim 1 wherein the scanning surface is, alternatively, a continuous belt or a rotating drum.

3. The system of claim 1 wherein the sensing apparatus includes:
   (a) first lined rulings associated with the scanning surface;
   (b) a light source having a light directed at the first lined rulings;
   (c) a photosensor directed at the first lined rulings, and wherein the photosensor generates a reflection signal indicative of an amount of light detected;
   (d) second lined rulings fixed between the photosensor and the first lined rulings, and whereby the photosensor detects the light from the light source as reflected off of the first lined rulings and back through the second lined rulings; and,
   (e) circuitry responsive to the reflection signal for determining a velocity of the surface of the photoconductive component based on a rate of change of the amount of light detected.

4. The system of claim 3 wherein the photosensor alternatively, a phototransistor or a photodiode.

5. The system of claim 3 wherein the amount of light detected is proportional to a phase of the first lined rulings in movement relative to the second lined rulings.

6. The system of claim 1 wherein the error generating apparatus includes:
   (a) first circuitry for generating an average value signal indicative of an average velocity of the scanning surface; and,
   (b) second circuitry for comparing the sensed velocity of the scanning surface to the average value signal to generate the velocity error value signal.

7. The system of claim 1 wherein the aberrations corrected include reducing banding effects.

8. The system of claim 1 wherein the output image signal corrector apparatus translates the velocity error value signal to a correction signal for controlling image transfer scanning circuitry associated with scanning the output image on the scanning surface.

9. The system of claim 1 wherein the output image signal corrector apparatus controls a laser diode relative to indicia selected from the group consisting of pulse width modulation duty cycle, timing, intensity, and movement of operation of the laser diode.

10. The system of claim 9 wherein the output image signal corrector apparatus chaotically operates the pulse width modulation duty cycle of the laser beam responsive to the velocity error value signal.

11. A system for reducing banding effects in a laser printer, comprising:
    (a) sensing apparatus for sensing an average velocity and a present velocity of a surface of a photoconductive component in the laser printer;
    (b) compare apparatus coupled to the sensing apparatus for comparing the average velocity with the present velocity and for generating a velocity error value signal for the surface; and,
    (c) corrector circuit apparatus coupled to the compare apparatus for translating the velocity error value signal to a correction signal for modifying a laser diode control signal in the laser printer, the control signal selected from the group consisting of pulse width modulation duty cycle, timing, intensity, and movement of operation of the laser diode, and whereby printed image banding effects are reduced.

12. A method for reducing aberrations in an output image of an image transfer apparatus, the method comprising:
    (a) sensing a velocity of a scanning surface associated with the image transfer apparatus;
    (b) generating a velocity error value signal for the surface;
    (c) translating the velocity error value signal to a correction signal; and,
    (d) modifying an output image signal, based on the correction signal, for reducing aberrations in the output image caused by variations in the velocity of the scanning surface.

13. The method of claim 12 wherein the scanning surface is, alternatively, a continuous belt or a rotating drum.

14. The method of claim 12 wherein the velocity of the scanning surface is sensed by:
    (a) directing a light onto a first lined rulings associated with the scanning surface;
    (b) detecting an amount of the light reflected off of the first lined rulings and back through a second lined rulings;
    (c) generating a reflection signal indicative of the amount of light detected; and,
    (d) determining the velocity of the scanning surface based on a rate of change of the reflection signal.

15. The method of claim 14 wherein the amount of light detected is proportional to a phase of the first lined rulings in movement relative to the second lined rulings.

16. The method of claim 12 wherein the step of generating a velocity error value signal includes comparing the sensed velocity of the scanning surface to an average velocity value signal.

17. The method of claim 12 wherein the aberrations reduced include banding effects.

18. The method of claim 12 wherein the output image signal controls a laser diode of the image transfer apparatus relative to indicia selected from the group consisting of pulse width modulation duty cycle, timing, intensity, and movement of operation of the laser diode.

19. The method of claim 18 wherein the correction signal chaotically modifies the pulse width modulation duty cycle of a laser beam associated with the laser diode.

* * * * *